(12) United States Patent
Liu

(10) Patent No.: US 10,387,705 B2
(45) Date of Patent: Aug. 20, 2019

(54) FINGERPRINT IDENTIFICATION ELECTRODE STRUCTURE

(71) Applicant: ILI TECHNOLOGY CORP., Hsinchu County (TW)

(72) Inventor: Tzu Wei Liu, Hsinchu County (TW)

(73) Assignee: ILI TECHNOLOGY CORP., Hsinchu County (TW)

( * ) Notice: Subject to any disclaimer, the term of this patent is extended or adjusted under 35 U.S.C. 154(b) by 6 days.

(21) Appl. No.: 15/386,579

(22) Filed: Dec. 21, 2016

(65) Prior Publication Data
US 2017/0193275 A1  Jul. 6, 2017

(30) Foreign Application Priority Data
Jan. 6, 2016  (TW) ............................. 105100226 A

(51) Int. Cl.
*G06K 9/00* (2006.01)
(52) U.S. Cl.
CPC .................................. *G06K 9/0002* (2013.01)
(58) Field of Classification Search
CPC ............ G06K 9/0002; G06K 9/00053; G06K 9/0004; G06K 9/2027; G06K 9/2036; G06K 9/0008; G06K 9/00087; G06K 19/07701; G06K 9/00033; G06K 2009/0006; G06K 2009/00932; G06K 9/00013; G06K 9/00067; G06K 9/00114; G06K 9/0012; G06K 9/00885; G06F 3/0421; G06F 21/32; G06F 21/83; G06F 2203/04103; G06F 2203/04106; G06F 3/03547; G06F 3/044; G06F 3/045; G06F 2203/04111; G06F 3/0414; G06F 1/1601; G06F 1/1626; G06F 1/163; G06F 1/1698; G06F 3/0412;
(Continued)

(56) References Cited

U.S. PATENT DOCUMENTS 6,310,683 B1 * 10/2001 Fujiwara .............. G06K 9/0004
250/556
9,151,790 B1 * 10/2015 Hoshtanar ................ G01D 5/24
(Continued)

FOREIGN PATENT DOCUMENTS

| CN | 1760631 | 4/2006 |
|---|---|---|
| CN | 201741166 | 2/2011 |

(Continued)

OTHER PUBLICATIONS

"Office Action of China Counterpart Application", dated Apr. 11, 2019, pp. 1-10.

*Primary Examiner* — Aklilu K Woldemariam
(74) *Attorney, Agent, or Firm* — JCIPRNET

(57) ABSTRACT

A fingerprint identification electrode includes a first conductive layer, a second conductive layer, and an insulating layer between the first conductive layer and the second conductive layer. The first conductive layer includes a plurality of first touch electrode strips. The second conductive layer includes a plurality of second touch electrode strips and a plurality of dummy electrodes. The first touch electrode strips and the second touch electrode strips intersect. The second touch electrode strips are separated from the dummy electrodes. A part of each of the first touch electrode strips that is located between any two adjacent second electrode strips overlaps at least one of the dummy electrodes.

28 Claims, 17 Drawing Sheets

(58) Field of Classification Search
CPC ............... G09G 3/3225; G09G 3/3406;
H01L 27/3244; H01L 2251/5338; H01L
27/3234; H01L 27/323; H01L 27/0255;
H01L 31/105; G02B 26/0833; G02B
6/12002; G02B 6/12004; G02B 6/2813;
G02B 6/4202; Y10T 156/10; Y10T
29/49124; F01N 11/007; F01N 2560/05;
F01N 2560/20; G01N 21/49; G06T
2207/30088; G06T 2207/30101; G06T
7/0012; G06T 7/42; G02F 1/1345; H01H
1/0036; H01H 67/22
USPC ............... 382/124, 115, 116; 345/173, 174;
257/432, 436
See application file for complete search history.

(56) References Cited

U.S. PATENT DOCUMENTS

| | | | | |
|---|---|---|---|---|
| 9,946,915 B1* | 4/2018 | Troccoli | ............... | G06K 9/0002 |
| 2005/0223818 A1* | 10/2005 | DeConde | ............... | G06K 9/0002 |
| | | | | 73/862.042 |
| 2005/0231216 A1* | 10/2005 | Gozzini | ............... | G06K 9/0002 |
| | | | | 324/663 |
| 2006/0050935 A1* | 3/2006 | Bustgens | ............. | G06K 9/0002 |
| | | | | 382/124 |
| 2006/0138574 A1* | 6/2006 | Saito | ........................ | G01L 1/146 |
| | | | | 257/417 |
| 2007/0134837 A1* | 6/2007 | Sato | ..................... | G06K 9/0002 |
| | | | | 438/48 |
| 2008/0054875 A1* | 3/2008 | Saito | .................... | A61B 5/1172 |
| | | | | 324/71.5 |
| 2012/0092294 A1* | 4/2012 | Ganapathi | .......... | G02B 26/0833 |
| | | | | 345/174 |
| 2012/0235264 A1* | 9/2012 | Takabayashi | ....... | G02B 6/12002 |
| | | | | 257/432 |
| 2013/0194071 A1* | 8/2013 | Slogedal | ............. | G06K 9/0002 |
| | | | | 340/5.82 |
| 2013/0278542 A1* | 10/2013 | Stephanou | ............ | G06F 3/0414 |
| | | | | 345/174 |
| 2014/0246746 A1* | 9/2014 | Yoneda | .................. | H01L 31/105 |
| | | | | 257/432 |
| 2014/0333328 A1* | 11/2014 | Nelson | ..................... | G06F 3/044 |
| | | | | 324/663 |
| 2015/0155077 A1* | 6/2015 | Yamazaki | ................. | H01B 1/04 |
| | | | | 174/257 |
| 2015/0242672 A1* | 8/2015 | Benkley, III | ......... | G06K 9/0008 |
| | | | | 382/124 |
| 2015/0347807 A1* | 12/2015 | Weber | .................. | G06K 9/0002 |
| | | | | 382/124 |
| 2016/0099107 A1* | 4/2016 | Lee | ......................... | H01G 4/012 |
| | | | | 174/260 |
| 2018/0107856 A1* | 4/2018 | Troccoli | ............... | G06K 9/0002 |

FOREIGN PATENT DOCUMENTS

| | | |
|---|---|---|
| CN | 104077574 | 10/2014 |
| TW | 201237772 | 9/2012 |
| TW | M459449 | 8/2013 |
| TW | M513411 | 12/2015 |

* cited by examiner

FINGERPRINT IDENTIFICATION ELECTRODE STRUCTURE

This application claims the benefit of Taiwan application Serial No. 105100226, filed Jan. 6, 2016, the subject matter of which is incorporated herein by reference.

BACKGROUND OF THE INVENTION

Field of the Invention

The invention relates in general to a fingerprint identification electrode structure, and more particularly, to a fingerprint identification electrode structure of a capacitive fingerprint reader.

Description of the Related Art

With progressing technologies, portable electronic devices, such as smart phones, tablet computers and laptop computers, have become essential tools in the daily life. These portable electronic devices provide ever-increasingly diversified functions, and are usually stored with personal information, e.g., phone books, photographs and personal data, which has a certain level of privacy. Although password mechanisms are currently used to prevent portable electronic devices from illegitimate use of others, passwords are prone to exposure and risks of being cracked, and thus yield rather unsatisfactory security. Further, a user is required to memorize a password to use a corresponding electronic device, which may cause user inconveniences. Therefore, means that identifies personal fingerprints for the purpose of identity verification have been developed.

In a conventional capacitive fingerprint reader, a grid structure formed by a plurality of driving electrodes and a plurality of sensing electrodes is used to detect ridges and valleys of a fingerprint to accordingly identify a pattern of the fingerprint. When such conventional capacitive fingerprint reader is incorporated into a portable electronic device, the fingerprint reader is usually disposed below the glass substrate and detects a fingerprint with the glass substrate in between. Although the fingerprint reader is capable of detecting a finger touch, differences between detected signals for ridges and valleys are extremely minute compared to an overall capacitance change caused by the finger. As a result, it is likely that the fingerprint reader incorrectly detects the fingerprint to further lead to a misjudgment. Therefore, there is a need to design a fingerprint reader capable of enhancing the finger identification rate.

SUMMARY OF THE INVENTION

It is an object of the present invention to provide a fingerprint identification electrode structure for enhancing an identification rate of a fingerprint reader.

To achieve the above object, the present invention provides a fingerprint identification electrode structure that is disposed on a substrate to detect a fingerprint of a finger. The fingerprint identification electrode structure includes a first conductive layer, a second conductive layer and an insulating layer. The first conductive layer includes a plurality of first touch electrode strips, which are separated from one another and extend along a first direction. The second conductive layer includes a plurality of second touch electrode strips and a plurality of dummy electrodes. The second touch electrode strips are separated from one another and extend along a second direction different from the first direction. The first touch electrode strips and the second touch electrode strips intersect. The second touch electrode strips are separated from the dummy electrodes. A gap between the second conductive layer and the finger is smaller than a gap between the first conductive layer and the finger, and a part of each of the first touch electrode strips that is located between any two adjacent touch electrode strips overlaps at least one of the dummy electrodes. The insulating layer is disposed between the first conductive layer and the second conductive layer.

To achieve the above object, the present invention further provides a fingerprint identification electrode structure, which is disposed on a substrate to detect a fingerprint of a finger. The fingerprint identification electrode structure includes a first conductive layer, a second conductive layer and an insulating layer. The first conductive layer includes a plurality of first touch electrode strips, which are separated from one another and extend along a first direction. Each of the first touch electrode strips includes a first strip portion, a plurality of first branches and a plurality of second branches. The first branches and the second branches extend along a second direction different from the first direction from two sides of the first strip portion, respectively. The second conductive layer includes a plurality of second touch electrode strips, which are separated from one another and extend along the second direction. The first touch electrode strips and the second touch electrode strips intersect and are insulated from one another. A gap between the second conductive layer and the finger is smaller than a gap between the first conductive layer and the finger. Each of the second touch electrode strips includes a second strip portion, a plurality of main branches, a plurality of second main branches, a plurality of first secondary branches, and a plurality of second secondary branches. The first main branches and the second main branches extend along the first direction from two sides of the second strip portion, respectively. The first secondary branches and the second secondary branches extend from two sides of each of the first main branches, respectively. Each of the first secondary branches extends to between each of the first branches adjacent to each of the first main branches and the second strip portion. Each of the second secondary branches extends to between each of the second branches adjacent to each of the first main branches and the second strip portion. The first main branches, the second main branches, the first secondary branches and the second secondary branches do not overlap the first branches and the second branches. The insulating layer is disposed between the first conductive layer and the second conductive layer.

To achieve the above object, the present invention further provides a fingerprint identification electrode structure, which is disposed on a substrate to detect a fingerprint of a finger. The fingerprint identification electrode structure includes a first conductive layer, an insulating layer and a second conductive layer. The first conductive layer includes a plurality of first touch electrode strips, which are separated from one another and extend along a first direction. Each of the first touch electrode strips includes a first strip portion, and a plurality first protrusions protruding from an upper surface of the first strip portion. The insulating layer is disposed on the first strip portion, and includes a plurality of openings. The protrusions penetrate the openings, respectively, and have a thickness greater than a thickness of the insulating layer. The second conductive layer is disposed on the insulating layer, and includes a plurality of second touch electrode strips that are separated from one another and extend along a second direction different from the first direction. The first touch electrode strips and the second touch electrode strips intersect and are insulated from one another. A gap between the second conductive layer and the finger is smaller than a gap between the first conductive layer and the finger.

In the fingerprint identification electrode structure of the present invention, with the dummy electrodes overlapping with the first touch electrode strips, the additional branches, main branches and secondary branches, or the protrusions penetrating the openings of the insulating layer, coupling capacitance between the first touch electrode strips and the second touch electrode strips may be increased. Thus, a difference between a total coupling capacitance value between ridges of a fingerprint and the fingerprint identification electrode structure and a total coupling capacitance value between valleys of the fingerprint and the fingerprint identification electrode structure can be increased, thereby enhancing the identification rate.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
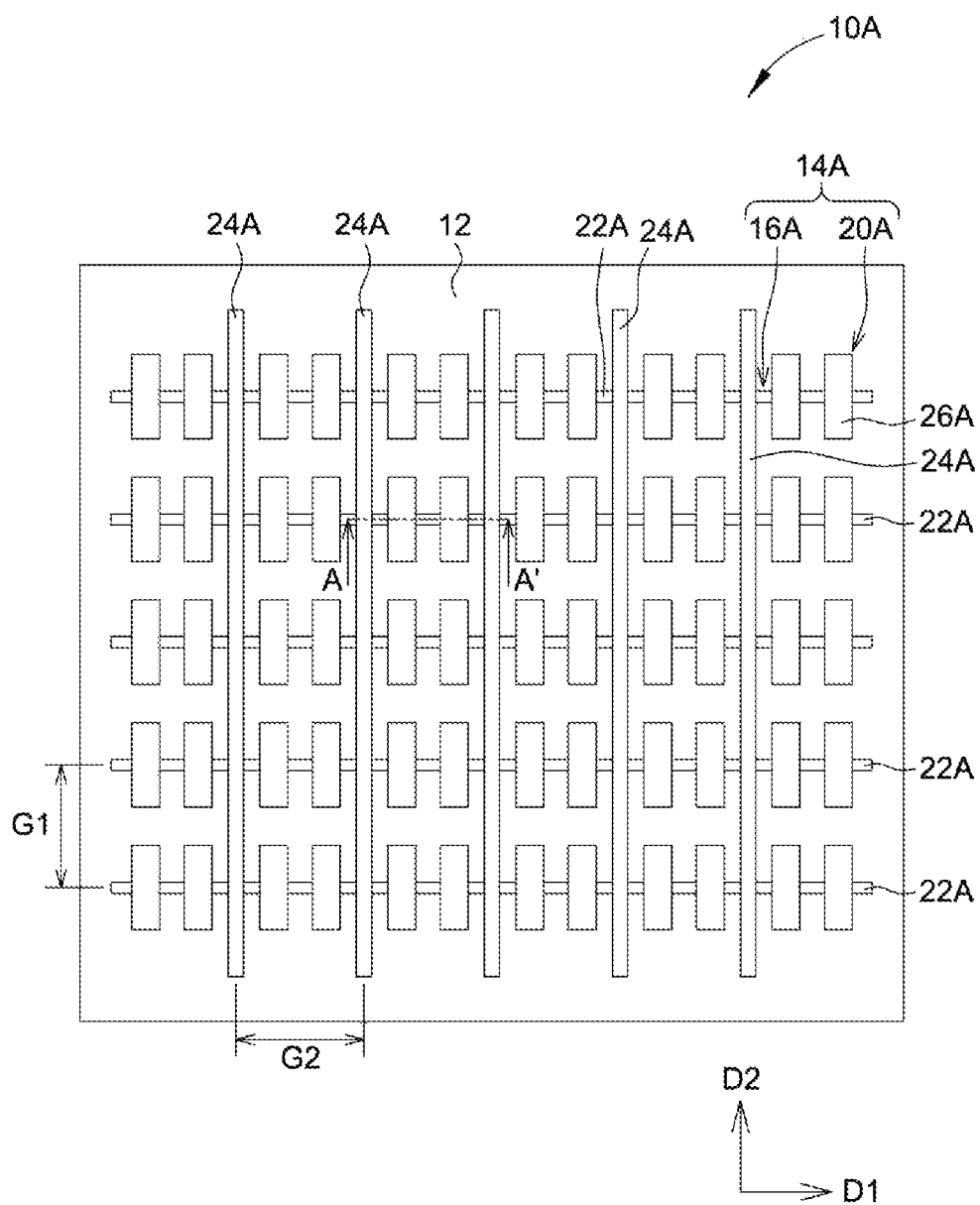
FIG. 1 shows a top view of a fingerprint reader according to a first embodiment of the present invention.
Figure 2:
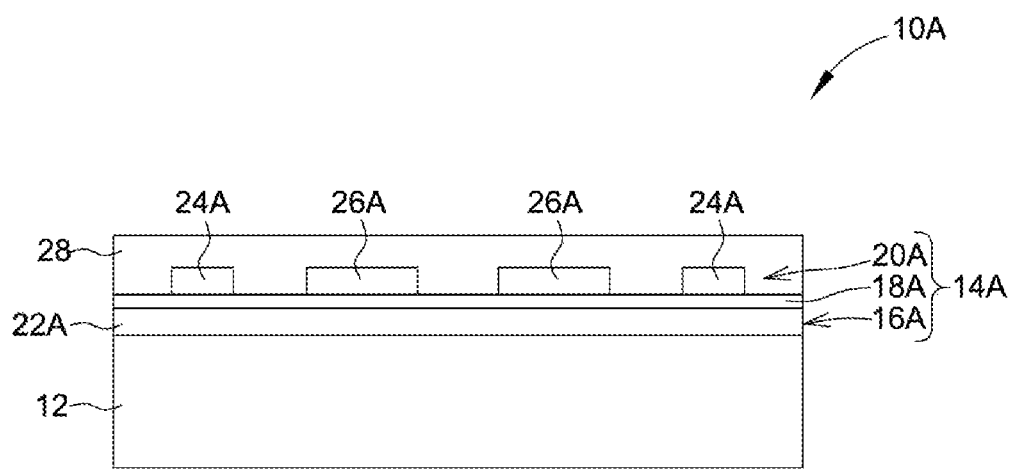
FIG. 2 is a section view along a section line A-A' in FIG. 1.

Referring to FIG. 1 and FIG. 2, FIG. 1 shows a top view of a fingerprint reader according to a first embodiment of the present invention; FIG. 2 shows a section view along a section line A-A' in FIG. 1. As shown in FIG. 1 and FIG. 2, a fingerprint reader 10A according to the embodiment includes a substrate 12 and a fingerprint identification electrode structure 14A. The fingerprint identification electrode structure 14A is disposed on the substrate 12, and detects a fingerprint of a finger. In this embodiment, the substrate 12 may be a transparent substrate. For example for not limited to, the transparent substrate may be a glass substrate, a tampered glass substrate, a quartz substrate, a sapphire substrate, a plastic substrate or a printed circuit board (PCB). The fingerprint identification electrode structure 14A includes a first conductive layer 16A, an insulating layer 18A and a second conductive layer 20A. The first conductive layer 16A, the insulating layer 18A and the second conductive layer 20A are sequentially formed on the substrate 12. The fingerprint reader 10A of this embodiment may be further adhered to a cover plate. When the fingerprint reader 10A performs fingerprint detection, the finger touches upon the cover plate. At this point, the cover plate is between the finger and the fingerprint identification electrode structure 14A, such that a gap between the second conductive layer 20A and the finger is smaller than a gap between the first conductive layer 16A and the finger. For example, the cover plate may be a glass substrate, a tampered glass substrate, a quartz substrate, a sapphire substrate or a plastic substrate, but the present invention is not limited herein. In another embodiment, the substrate may directly be the cover plate, such that the gap between the second conductive layer and the finger is smaller than the gap between the first conductive layer and the finger. The first conductive layer, insulating layer and the second conductive layer need to be stacked in a reverse order, i.e., the second conductive layer, the insulating layer and the first conductive layer are sequentially formed on the substrate.

Further, the first conductive layer 16A includes a plurality of first touch electrode strips 22A, which are separated from one another and extend along a first direction D1. The second conductive layer 20A includes a plurality of second touch electrode strips 24A and a plurality of dummy electrodes 26A. The second touch electrode strips 24A are separated from one another and extend along a second direction D2 different from the first direction D1. As such, the first touch electrode strips 22A and the second touch electrode strips 24A intersect. The insulating layer 18A is disposed between the first conductive layer 16A and the second conductive layer 20A, and electrically insulates the first touch electrode strips 22A from the second touch electrode strips 24A. In this embodiment, a first gap G1 between centers of two adjacent first touch electrode strips 22A, i.e., a pitch between the centers of any first touch electrode strip and its one adjacent first touch electrode strip, is smaller than or equal to 50 μm. This range is smaller a gap between ridges and valleys of a fingerprint, and so different first touch electrode strips 22A may generate different coupling capacitance values for the ridges and valleys of the fingerprint. Similarly, a second gap G2 between centers of two adjacent second touch electrode strips 24A, i.e., a pitch between the centers of any second touch electrode strip 24A and its one adjacent second touch electrode strip 24A, is smaller than or equal to 50 μm. Thus, different second electrode strips 24A may generate different coupling capacitance values for the ridges and valleys of the fingerprint, to accordingly detect the fingerprint of the finger using the fingerprint identification electrode structure 14A. In this embodiment, the first touch electrode strips 22A and the second touch electrode strips 24A are long strips, but are not limited to such shape. In another embodiment, the first touch electrode strips and the second touch electrode strips may include respective branches to increase the coupling capacitance between the intersecting first touch electrode strips and second touch electrode strips.

The dummy electrodes 26A are separated from one another and are also separated from the second touch electrode strips 24A. A part of each first touch electrode strip 22A that is located between any two adjacent second touch electrode strips 24A intersects and overlaps at least one of the dummy electrodes 26A. In this embodiment, for example, the part of each first touch electrode strips 22A that is located between any two adjacent second intersects and overlaps two dummy electrodes 26A, but the present invention is not limited herein. As previously described, the dummy electrodes 26A are separated and electrically insulated from the second touch electrode strips 24A, and are kept floating. The dummy electrodes 26A that overlap different first touch electrode strips 22A are separated from one another, so as to prevent signals of adjacent first touch electrode strips 22A from mutual interference. Because the gap between any two adjacent second touch electrode strips 24A needs to be smaller than or equal to 50 μm, in this embodiment, a width of each dummy electrode 26A in the first direction D1 is smaller than one-half of the gap between any two adjacent second touch electrode strips 24A, so as to prevent the dummy electrodes 26A from coming into contact with the second touch electrode strips 24A. In the present invention, the number and width of the dummy electrodes overlapping the part of each first touch electrode strip located between any two adjacent second touch electrode strips are not limited to the above values, and the number of dummy electrodes may be correspondingly adjusted according to the width of the dummy electrodes in the first direction when given a limited gap between any two adjacent second touch electrode strips. For example, two to three dummy electrodes may be placed between two adjacent second touch electrode strips 24A. In another embodiment, when the width of the dummy electrodes 26A in the first direction is close to the gap between any two adjacent second touch electrode strips, the number of the dummy electrodes 26A located between the two adjacent touch electrode strips and overlapping the same first touch electrode strip is one. Alternatively, when a multiple of the width of the dummy electrodes in the first direction is still smaller than the gap between any two adjacent second touch electrode strips, the number of dummy electrodes between the two adjacent second touch electrode strips and overlapping the same touch electrode strip may be plural.

An identification rate (SNR) parameter is generally used for determining the capability for identifying a fingerprint of a fingerprint identification electrode structure. The identification rate SNR is expressed by an equation: SNR=ΔC/CR, where ΔC is a difference between a total coupling capacitance value between ridges of a fingerprint and a fingerprint identification electrode structure and a total coupling capacitance value between valleys of the fingerprint and the fingerprint identification electrode structure, and CR is a coupling capacitance value between a sensing electrode and the finger. In the fingerprint identification electrode structure 14A of the embodiment, the dummy electrodes 26A are designed to overlap the first touch electrode strip 22A located between any two adjacent second touch electrode strips 24A. Therefore, compared to a conventional fingerprint identification electrode structure without any dummy electrodes, the difference between the total coupling capacitance value between the ridges of a fingerprint and the fingerprint identification electrode structure 14A and the total coupling capacitance value between the valleys of the fingerprint and the fingerprint identification electrode structure 14A is effectively increased, such that the identification rate of the fingerprint identification electrode structure 14A is enhanced. Associated reasons are given in detail below.

In this embodiment, the insulating layer 18A does not include any opening, and covers the first touch electrode strips 22A and the substrate 12. The thickness of the insulating layer 18A may be between 2000 to 3000 angstroms (Å) or greater than 10 μm. The thickness is of the insulating layer 18A is determined by the fabrication process used by the fingerprint identification electrode structure 14A. For example, when the fingerprint identification electrode structure 14A is manufactured by screen printing, the thickness of the insulating layer 18A is greater than 10 μm. When the fingerprint identification electrode structure 14A is manufactured by lithography and etching processes, the thickness of the insulating layer 18A is between 2000 Å and 3000 Å. The thickness of the insulating layer is not limited to the above examples. It should be noted that, when the thickness of the insulating layer 18A is between 2000 Å and 3000 Å, higher coupling capacitance is generated between the first touch electrode strips 22A and the dummy electrodes 26A since the first touch electrode strips 22A overlap the dummy electrodes 26A, in a way that the coupling capacitance between the first touch electrode strips 22A and the second touch electrode strips 24A is increased. Further, when the finger touches the cover plate, the coupling capacitance between the first touch electrode strips 22A and the finger may be further increased through the dummy electrodes 26A, so as to increase the coupling capacitance value of the ridges and valleys detected.

In this embodiment, for example but not limited to, each of the first touch electrode strips 22A may be a driving electrode strip that transmits a driving signal, and each of the second touch electrode strips 24A may be a sensing electrode strip that senses a capacitance change generated by the ridges or valleys of the fingerprint to generate a sensing signal. In another embodiment, each of the first touch electrode strips may be a sensing electrode strip that senses a capacitance change generated by the ridges or valleys of the fingerprint to generate a sensing signal, and each of the second touch electrode strips may be a driving electrode strip that transmits a driving signal. In this embodiment, assuming that the second touch electrode strips 24A serve as sensing electrode strips, a first coupling capacitance value may be generated between the sensing electrodes and the finger. In another embodiment, assuming that the first touch electrode strips serve as sensing electrode strips, the sensing electrode strip couple with the finger through the dummy electrodes, and so a second coupling capacitance value generated between the sensing electrode strips and the finger is greater than the foregoing first coupling capacitance value. More particularly, when the thickness of the insulating layer is between 2000 Å and 3000 Å, a significant coupling effect takes places between the dummy electrodes and the sensing electrode strips, and the potential of the dummy electrodes approximates the potential of the sensing electrode strips, such that the second coupling capacitance value is increased. Therefore, the identification rate of the fingerprint identification electrode structure 14A using the second touch electrode strips as sensing electrode strips in one embodiment is better than the identification rate of a fingerprint identification electrode structure using the second touch electrode strips 24A as sensing electrode strips in another embodiment.

It should be noted that, because the second touch electrode strips 24A directly generate coupling with the finger, a less amount of coupling is generated with the finger through the dummy electrodes 26A. Thus, when the second touch electrode strips 24A serve as sensing electrode strips, the coupling capacitance value CR between the sensing electrode strips and the finger hardly increases in this embodiment compared to a fingerprint identification electrode structure without the dummy electrodes. Thus, it is known that, without increasing the coupling capacitance value CR between the sensing electrode strips and the finger, the fingerprint identification electrode structure 14A using the second electrode strips 24A as the sensing electrodes effectively increases the difference ΔC between the total coupling capacitance between the ridges of the fingerprint and the fingerprint identification electrode structure 14A and the total coupling capacitance between the valleys of the fingerprint and the fingerprint identification electrode structure 14A, thereby enhancing the identification rate SNR. Known from the rule of thumb, compared to a fingerprint identification electrode structure without dummy electrodes, identification rate SNR of the fingerprint identification electrode structure 14A of the embodiment is effectively increased by approximately 68%.

In this embodiment, the fingerprint reader 10A may further include a protection layer 28 covering the second conductive layer 20A and the insulating layer 18A to protect the second touch electrode strips 24A and the dummy electrodes 26A. In another embodiment, when the substrate is directly used as a cover plate and stacking is in a reverse order, the protection layer covers the first conductive layer to protect the first touch electrode strips.

The fingerprint reader of the present invention is not limited to the above example. Other embodiments of the fingerprint reader are given below. To keep the description simple and to emphasize the differences between the embodiments, the same denotations are used for the same elements, and details of such repeated parts are omitted herein.

Figure 3:
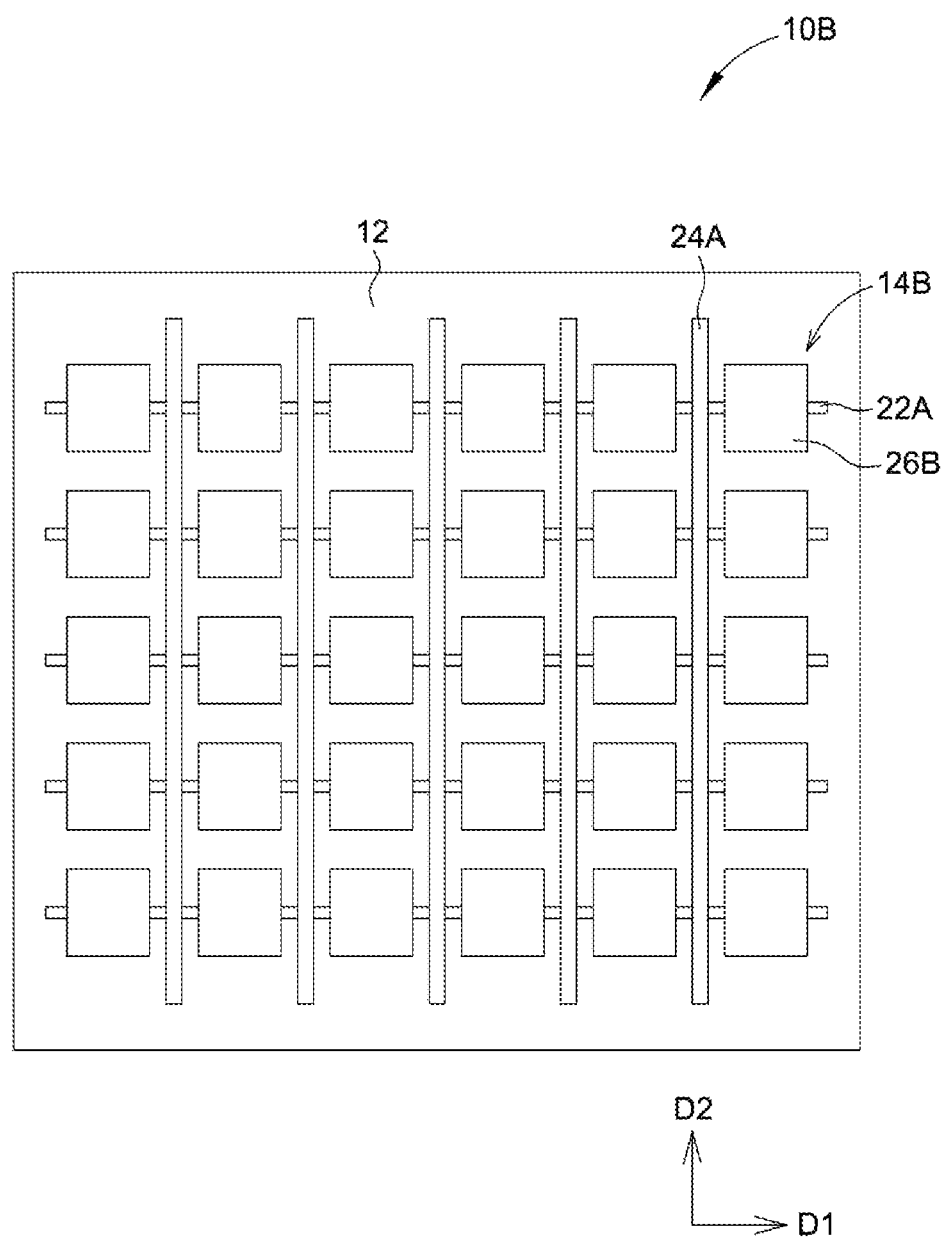
FIG. 3 is a top view of a fingerprint reader according to a second embodiment of the present invention.

FIG. 3 shows a top view of a fingerprint reader according to a second embodiment of the present invention. As shown in FIG. 3, one difference of a fingerprint reader 10B of this embodiment from the first embodiment is that, a part of each of first touch electrode strips 22A of this embodiment that is located between any two adjacent second touch electrode strips 24A intersects and overlaps one of dummy electrodes 26B, and so a width of each of the dummy electrodes 26B in the first direction D1 is close to a gap of any two adjacent second touch electrode strips 24A. For example, as opposed to a fingerprint identification electrode structure without dummy electrodes, the identification rate of the fingerprint identification electrode structure 14B is effectively increased by approximately 35%.

Figure 4:
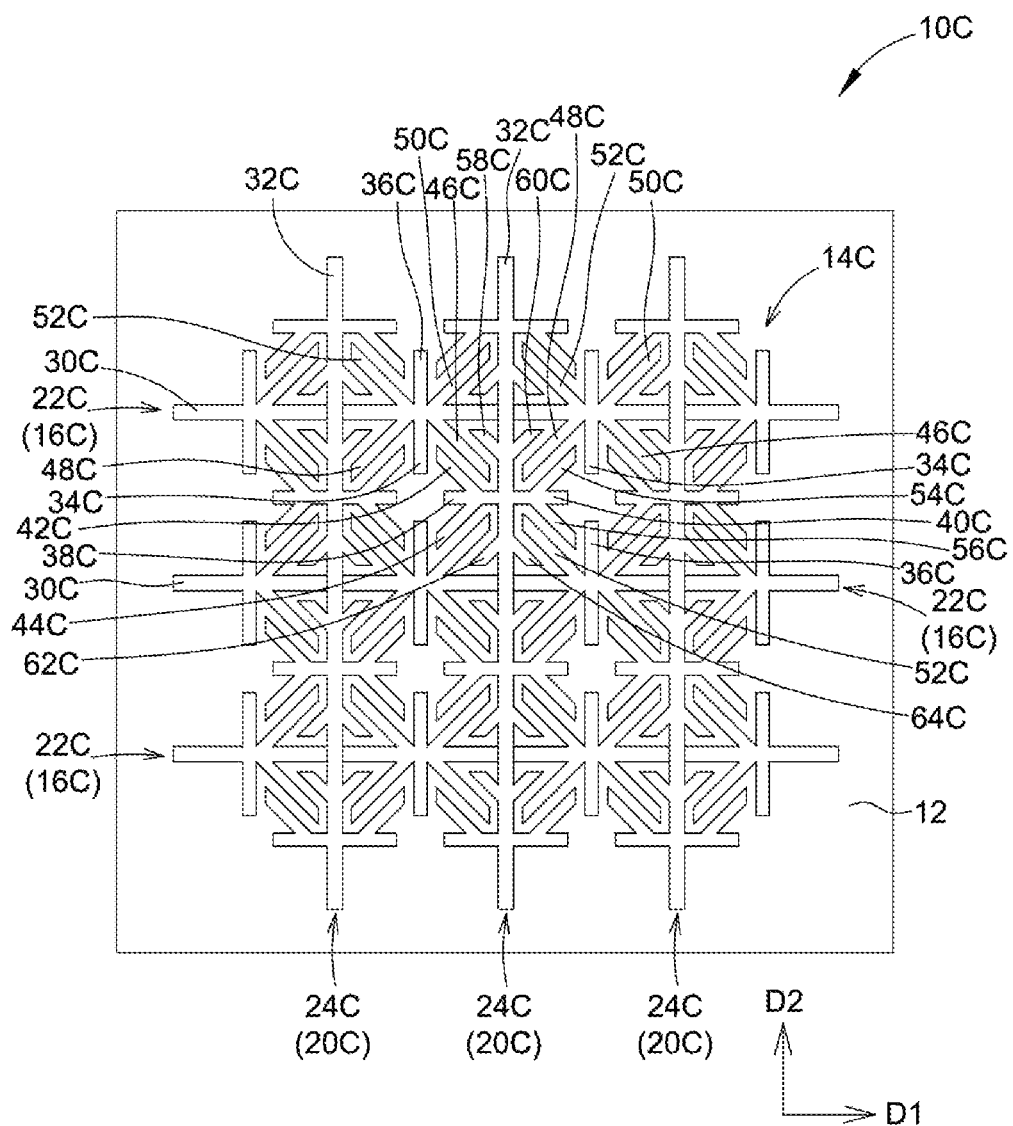
FIG. 4 is a top view of fingerprint reader according to a third embodiment of the present invention.
Figure 5:
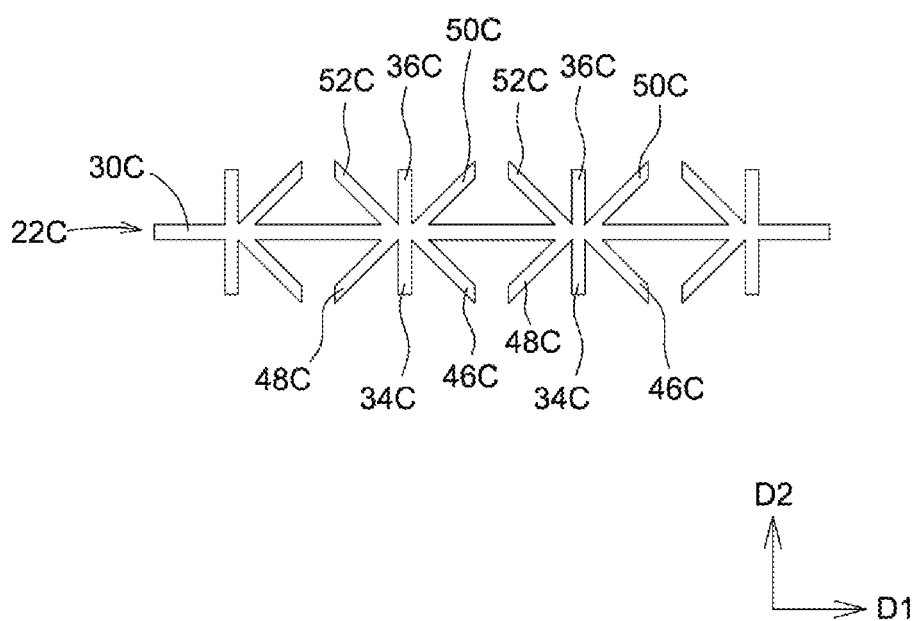
FIG. 5 is a top view of a first touch electrode strip according to the third embodiment of the present invention.
Figure 6:
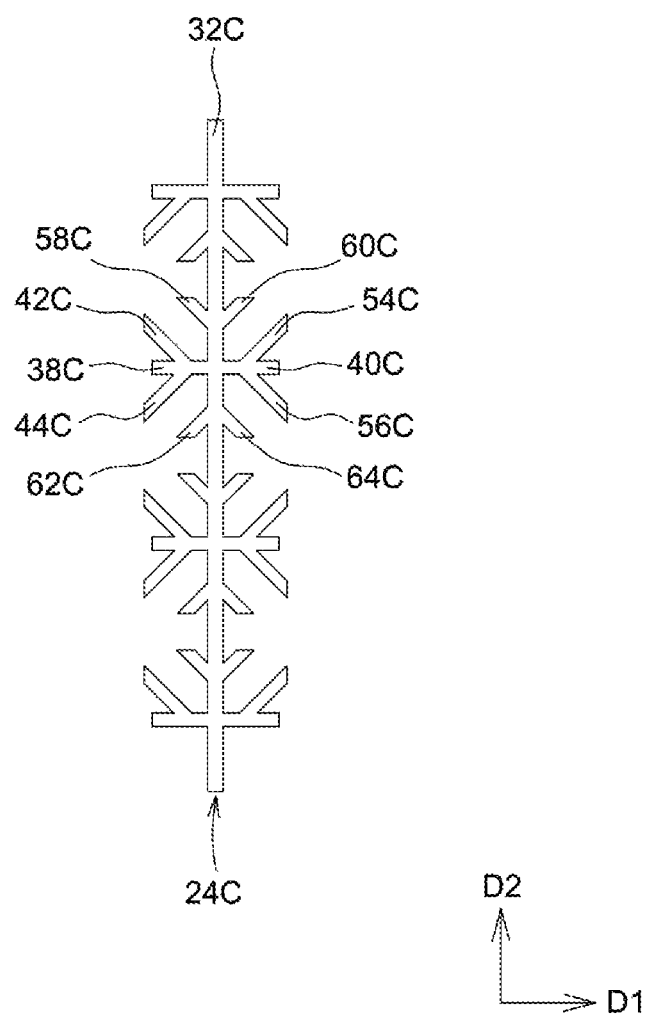
FIG. 6 is a top view of a second touch electrode strip according to the third embodiment of the present invention.

Referring FIG. 4 to FIG. 6, FIG. 4 shows a top view of a fingerprint reader according to a third embodiment of the present invention; FIG. 5 shows a top view of a first touch electrode strip according to the third embodiment of the present invention; FIG. 6 shows top view of a second touch electrode strip according to the third embodiment of the present invention. As shown in FIG. 4, differences of a fingerprint reader 10C of this embodiment from the first embodiment are that, a second conductive layer 20C of this embodiment includes only the second touch electrode strips 24C but not any dummy electrodes, each of first touch electrode strips 22C of a first conductive layer 16C includes a first strip portion 30C and a plurality of branches, and each of second touch electrode strips 24C includes a second strip portion 32C, a plurality of main branches and a plurality of secondary branches. The first strip portion 30C of each first touch electrode strip 22C extends along the first direction D1, and the second strip portion 32C of each second touch electrode strip 24C extends along the second direction D2, such that the first strip portion 30C and the second strip portion 32C intersect each other. The branches extend from the first strip portion 30C, and, in a direction perpendicular to the substrate 12, do not overlap the second touch electrode strips 24C. The main branches extend from the second strip portion 32C, and the secondary branches extend from the main branches. Further, in the direction perpendicular to the substrate 12, the main branches and the secondary branches do not overlap the first touch electrode strips 22C.

More specifically, as shown in FIG. 5, the branches of each first touch electrode strip 22 may include a plurality of first branches 34C and a plurality of second branches 36C. The first branches 34C and the second branches 36C extend along the second direction D1 and a direction opposite the second direction D2 from two sides of the first strip portion 30C, respectively. The main branches of each second touch electrode strip 24C may include a plurality of first main branches 38C and a plurality of second main branches 40C, and the secondary branches may include a plurality of first secondary branches 42C and a plurality of second secondary branches 44C. The second main branches 40C and the first main branches 38C extend along the first direction D1 and a direction opposite the first direction D1 from two sides of the second strip portion 32C, respectively. Each first secondary branch 42C extends to between each first branch 34C adjacent to each first main branch 38C and the second strip portion 32C, and each second secondary branch 44C extends to between each second branch 36C adjacent to each first main branch 38C and the second strip portion 32C. In the direction perpendicular to the substrate 12, the first main branches 38C, the second main branches 40C, the first secondary branches 42C and the second secondary branches 44C do not overlap the first branches 34C and the second branches 36C.

In this embodiment, the first branches 34C and the second branches 36C of each first touch electrode strip 22C are located between any two adjacent second strip portions 32C, and are symmetrical with the first strip portion 30C as an axis of symmetry. Further, the branches of each first touch electrode strip 22C further includes a plurality of third branches 46C, a plurality of fourth branches 48C, a plurality of fifth branches 50C and a plurality of sixth branches 52C. The third branches 46C and the fourth branches 48C of each first touch electrode strip 22C are located between any two adjacent second strip portions 32C, and respectively extend from the first strip portion 30C at the two sides of each first branch 34C and are in contact with the first branch 34C. As such, for each first touch electrode strip 22C, each first branch 34C, each third branch 46C and each fourth branch 48C located between any two adjacent second strip portions 32C form a first trident-shaped structure. The fifth branches 50C and the sixth branches 52C of each first touch electrode strip 22C are located between any two adjacent second strip portions 32C, and respectively extend from the first strip portion 30C at the two sides of each second branch 36C and are in contact with the second branch 36C. As such, each second branch 36C, each fifth branch 50C and each sixth branch 56C of each first touch electrode strip 22C located between any two adjacent second strip portions 32C form a second trident-shaped structure. In one embodiment, each first trident-shaped structure is symmetrical to each second trident-shaped structure, and so the two form an asterisk-shaped structure.

Further, as shown in FIG. 6, the first main branches 38C and the second main branches 40C of each second touch electrode strip 24C are located between any two adjacent first strip portions 30C, and are symmetrical to each other with the second strip portion 32C as an axis of symmetry. Further, each first secondary branch 42C extends to between each first branch 34C and each third branch 46C, and each second secondary branch 44C extends to between each second branch 36C and each fifth branch 50C. Between two adjacent first strip portions 30C, each first main branch 38C, each first secondary branch 42C and each second secondary branch 44C form a third trident-shaped structure. The secondary branches of each second touch electrode strip 24C may further include a plurality of third secondary branches 54C and a plurality of fourth secondary branches 56C. The third secondary branches 54C and the fourth secondary branches 56C extend from two sides of each second main branch 40C. Each third secondary branch 54C extends to between each first branch 34C and each fourth branch 48C, and each fourth secondary branch 56C extends to between each second branch 36C and each sixth branch 52C. Between two adjacent first strip portions 30C, each second main branch 40C, each third secondary branch 54C and each fourth secondary branch 56C form a fourth trident-shaped structure.

The secondary branches of each second touch electrode strip 24C may further include a plurality of fifth secondary branches 58C, a plurality of sixth secondary branches 60C, a plurality of seventh secondary branches 62C and a plurality of eighth secondary branches 64C. The fifth secondary branches 58C, the sixth secondary branches 60C, the seventh secondary branches 62C and the eighth secondary branches 64C are located between any two adjacent first strip portions 30C. More specifically, each fifth secondary branch 58C and each sixth secondary branch 60C respectively extend from two sides of the second strip portion 32C, and respectively extend to between each third branch 46C and the second strip portion 32C and to between each fourth branch 48C and the second strip 32C. Each seventh secondary branch 62C and each eighth secondary branch 64C respectively extend from two sides of each second strip portion 32C, and respectively extend to between each fifth branch 50C and the second strip portion 32C and to between each sixth branch 52C and the second strip portion 32C. Further, in the direction perpendicular to the substrate 12, the asterisk-shaped structures and the first strip portions 30 of the first touch electrode strips 22C do not intersect or overlap the third trident-shaped structures, the fourth trident-shaped structures, the fifth secondary branches 58C, the sixth secondary branches 60C, the seventh secondary branches 62C and the eighth secondary branches 64C of the second touch electrode strips 24C.

It should be noted that, the fingerprint identification electrode structure 14C of this embodiment is capable of increasing the coupling capacitance between the first touch electrode strips and the second touch electrode strips through the design of the branches of the first touch strip portions 22C and the main and secondary branches of the second touch electrode strips 24C, thereby increasing the difference between the total coupling capacitance value between the ridges of the fingerprint and the fingerprint identification electrode structure 14C and the total coupling capacitance value between the valleys of the fingerprint and the fingerprint identification electrode structure 14C. For example, as opposed to a conventional fingerprint identification electrode structure having a grid structure, the identification rate of the fingerprint identification electrode structure 14C of this embodiment is effectively increased by approximately 26%.

In another embodiment, the second conductive layer may further include dummy electrodes that, in the direction perpendicular to the substrate, overlap the first touch electrode strips. For example, the dummy electrodes may overlap at least one of the first, second, third, fourth, fifth and sixth branches, and the first strip portions. Alternatively, in the direction perpendicular to the substrate, the dummy electrodes do not overlap the first touch electrode strips and the second touch electrode strips.

Figure 7:
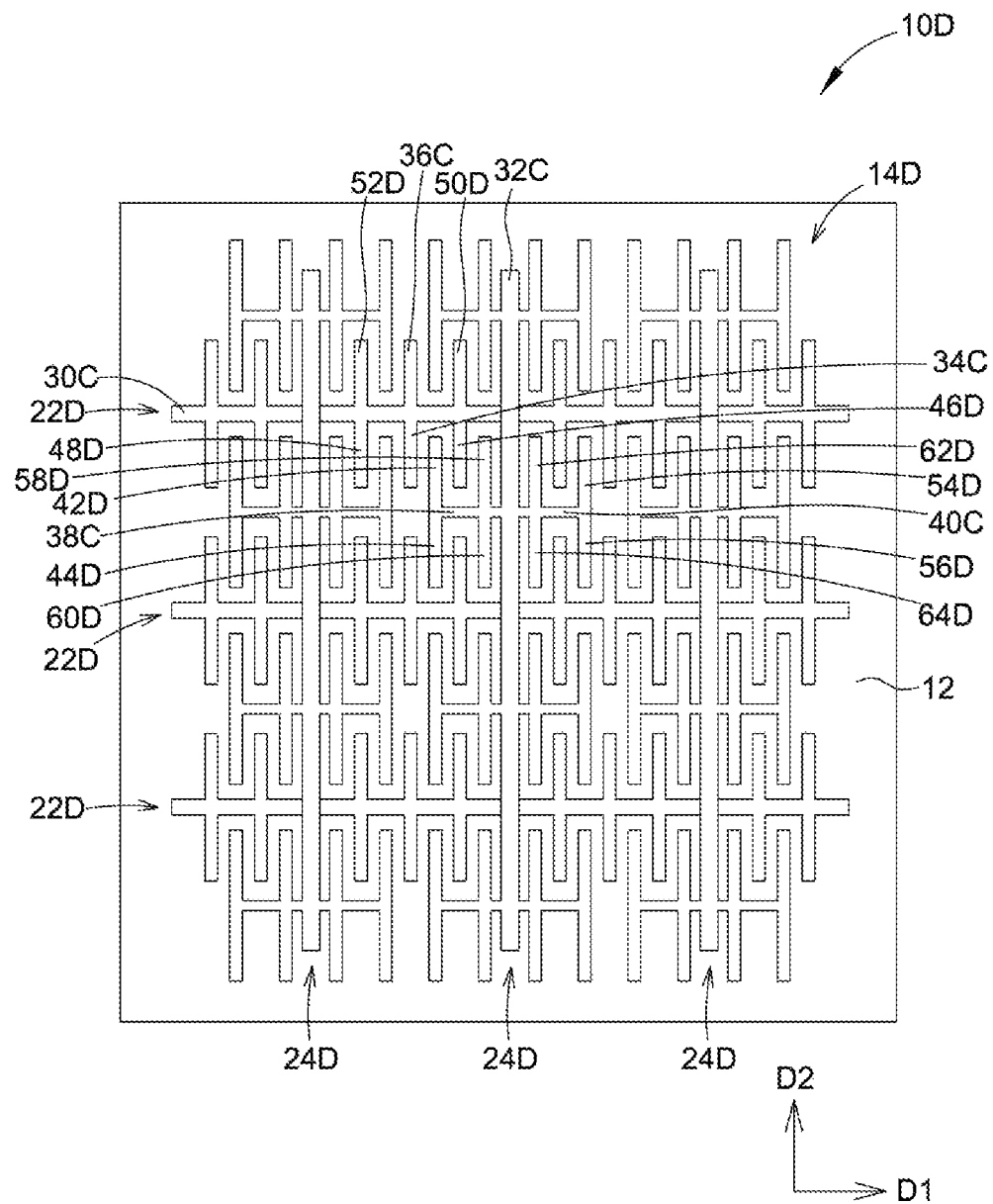
FIG. 7 is a top view a fingerprint reader according to a fourth embodiment of the present invention.
Figure 8:
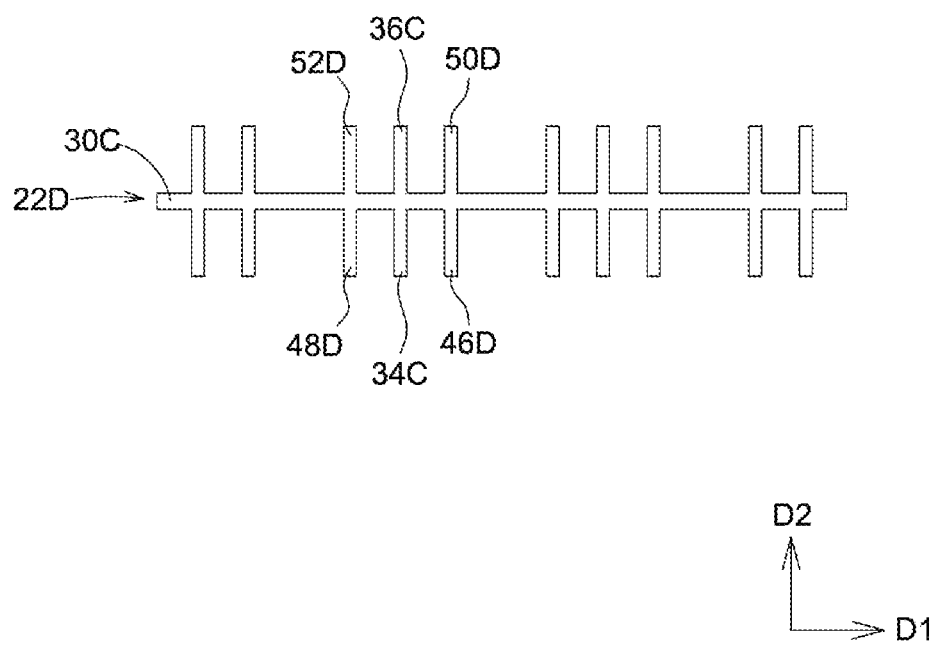
FIG. 8 is a top view of a first touch electrode strip according to the fourth embodiment of the present invention.
Figure 9:
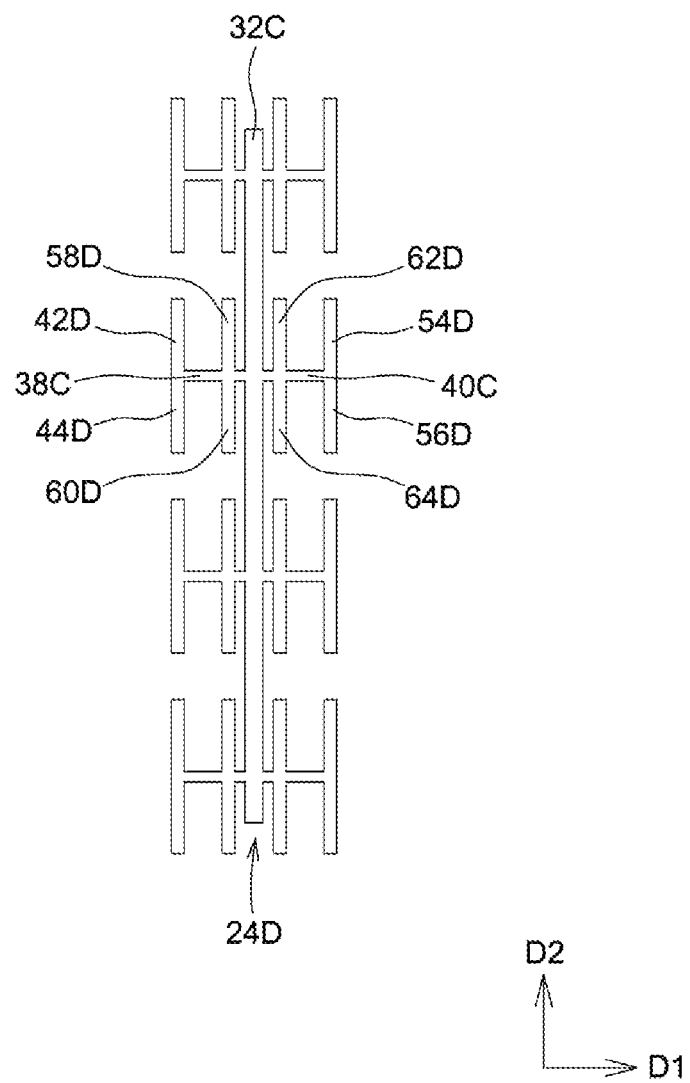
FIG. 9 is a top view of a second touch electrode strip according to the fourth embodiment of the present invention.

Referring to FIG. 7 to FIG. 9, FIG. 7 shows a top view of a fingerprint reader according to a fourth embodiment of the present invention; FIG. 8 shows a top view of a first touch electrode strip according to the fourth embodiment of the present invention; FIG. 9 shows a top view of a second touch electrode strip according to the fourth embodiment of the present invention. As shown in FIG. 7 to FIG. 9, differences of a fingerprint reader 10D of this embodiment from the third embodiment are that, third branches 46C and fourth branches 48D of each first touch electrode strip 22D extend along a direction opposite the second direction D2 from one side of the first strip portion 30C connected to the first branches 34C, and fifth branches 50D and sixth branches 52D extend along the second direction D2 from one side of the first strip portion 30C connected to the second branches 36C. The third branches 46D and the fifth branches 50D are symmetrical with the first strip portion 30C as an axis of symmetry, and the fourth branches 48D and the sixth branches 52D are symmetrical with the first strip portion 30C as an axis of symmetry. Thus, each first touch electrode strip 22D may be a first trellis structure.

In this embodiment, each first secondary branch 42D extends along the second direction D2 to between each first branch 34C and each third branch 46D, and each second secondary branch 44D extend along a direction opposite the second direction D2 to between each second branch 36C and each fifth branch 50D. Each third secondary branch 54D extends along the second direction D2 to between each first branch 34C and each fourth branch 48D. Each fourth secondary branch 56D extend along the direction opposite the second direction D2 to between each second branch 36C and each sixth branch 52D. Each first secondary branch 42D and each second secondary branch 44D are symmetrical with the first main branch 38C as an axis of symmetry, and each third secondary branch 54D and each fourth secondary branch 56D are symmetrical with the second main branch 40C as an axis of symmetry.

Further, in each second touch electrode strip 24D of this embodiment, each fifth secondary branch 58D is disposed between each first secondary branch 42D and the second strip portion 32C, and extends along the second direction D2 from one side of the first main branch 38C connected to each first secondary branch 42D to between each third branch 46D and the second strip portion 32C. Each sixth secondary branch 60D is disposed between each second secondary branch 44D and the second strip portion 32C, and extends along a direction opposite the second direction D2 from one side of the first main branch 38C connected to each second secondary branch 44D to between each fifth branch 50D and the second strip 32C. Each seventh secondary branch 62D is disposed between each third secondary branch 54D and the second strip portion 32C, and extends along the second direction D2 from one side of the second main branch 40C connected to each third secondary branch 54D to between each fourth branch 48D and the second strip portion 32C. Each eighth secondary branch 64D is disposed between each fourth secondary branch 56D and the second strip portion 32C, and extends along the direction opposite the second direction D2 from one side of the second main branch 40C connected to each fourth secondary branch 56D to between each sixth branch 52D and the second strip portion 32C. Each fifth secondary branch 58D and each sixth secondary branch 60D are symmetrical with the first main branch 38C as an axis of symmetry. Each seventh secondary branch 62D and each eighth secondary branch 64D are symmetrical with the second main branch 40C as an axis of symmetry. Thus, between any two adjacent first strip portions 30C, each first main branch 38C, each second main branch 40C, each first secondary branch 42D, each second secondary branch 44D, each third secondary branch 54D, each fourth secondary branch 56D, each fifth secondary branch 58D, each sixth secondary branch 60D, each seventh secondary branch 62D and each eighth secondary branch 64D and a part of the second strip portion 32C may form a second trellis structure. Further, the first trellis structure and the second trellis structure are staggered and do not intersect or overlap each other.

It should be noted that, through the first trellis structures of the first touch electrode strips 22D and the second trellis structures of the second touch electrode strips 24D, the fingerprint identification electrode structure 14D of the embodiment is capable of increasing the coupling capacitance between the intersecting first electrode touch strips 22D and second touch electrode strips 24D, thereby increasing the difference between the coupling capacitance between the ridges of the fingerprint and the fingerprint identification electrode structure 14D and the total coupling capacitance between the valleys of the fingerprint and the fingerprint identification electrode structure 14D. For example, as opposed to a conventional fingerprint identification electrode structure having a grid structure, the identification rate of the fingerprint identification electrode structure 14D of the embodiment is effectively increased by approximately 66%.

In another embodiment, the second conductive layer may further include dummy electrodes that, in a direction perpendicular to the substrate, overlap the first touch electrode strips. For example, the dummy electrodes may overlap at least one of the first, second, third, fourth, fifth and sixth branches and the first strip portion. Alternatively, in the direction perpendicular to the substrate, the dummy electrodes do not overlap the first touch electrode strips and the second touch electrode strips.

Figure 10:
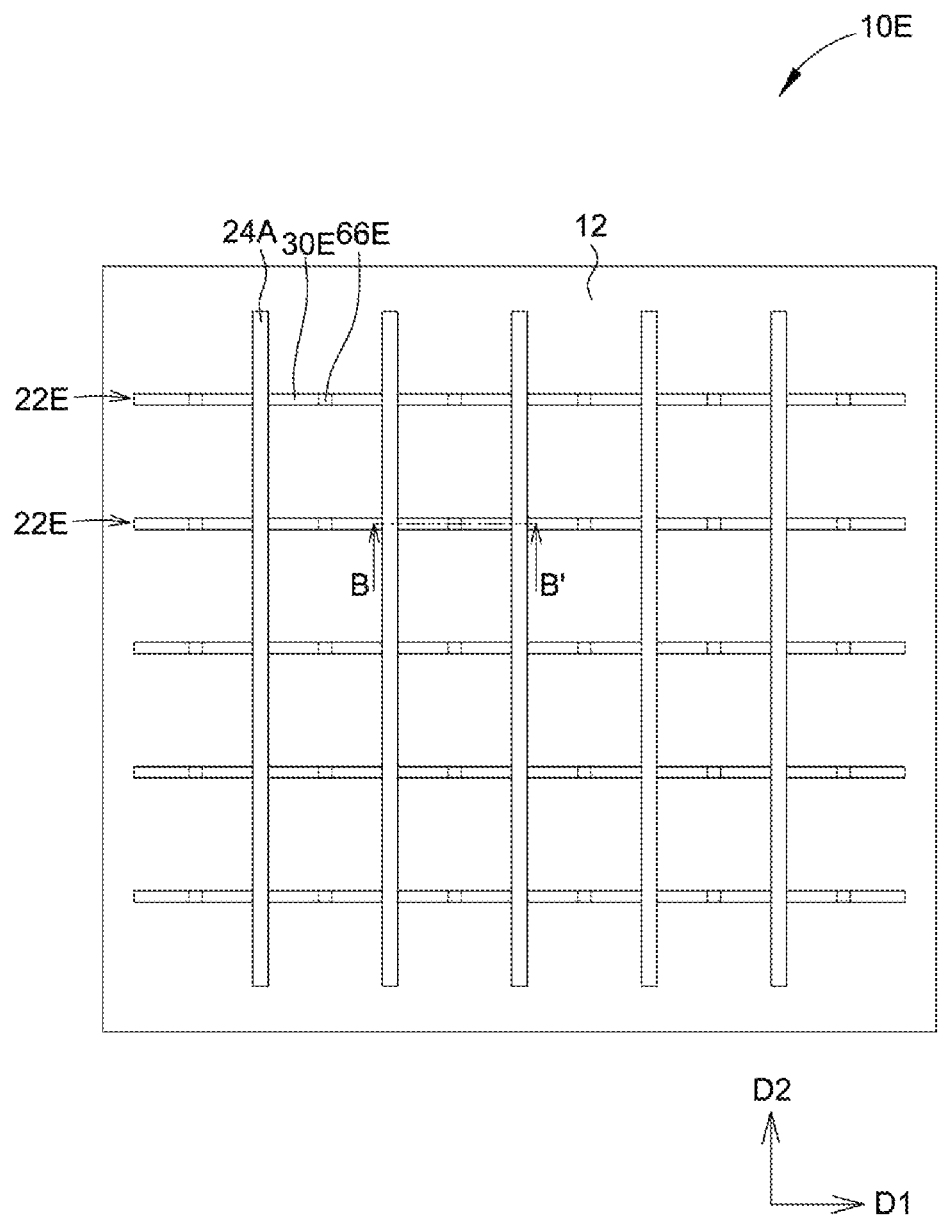
FIG. 10 is a top view of a fingerprint reader according to a fifth embodiment of the present invention.
Figure 11:
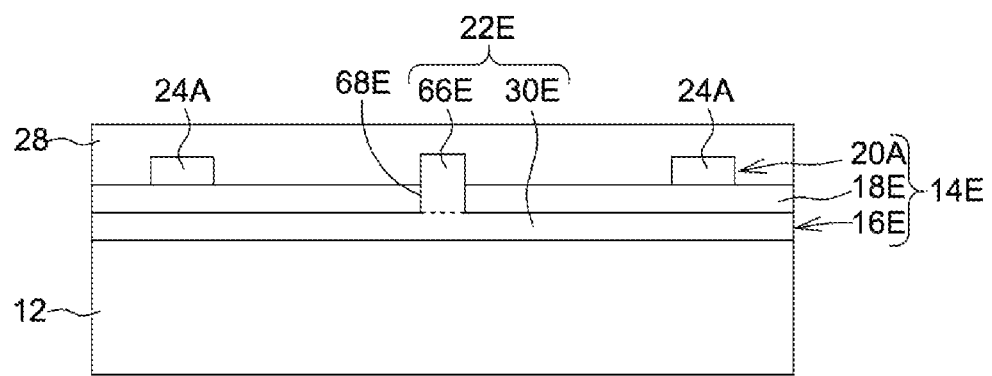
FIG. 11 is a section view along a section line B-B' in FIG. 10.

Referring to FIG. 10 and FIG. 11, FIG. 10 shows a top view of a fingerprint reader according to a fifth embodiment of the present invention; FIG. 11 shows a section view along a section line B-B' in FIG. 10. As shown in FIG. 10 and FIG. 11, differences of a fingerprint reader 10E of this embodiment from the first embodiment are that, a fingerprint identification electrode structure 14E of this embodiment does not include any dummy electrode. Further, each of first touch electrode strips 22E includes a first strip portion 30E and a plurality of first protrusions 66E, with each of the first protrusions 66E protruding from an upper surface of the first strip portion 30E. An insulating layer 18E includes a plurality of first openings 68E. The first protrusions 66E penetrate the first openings 68E, respectively, and the thickness of the first protrusions 66E is greater than the thickness of the insulating layer 18E. More specifically, each first protrusion 66E of each first touch electrode strip 22E is located between any two adjacent second touch electrode strips 24A, and each first protrusion 66E penetrates each first opening 68E, such that, in a direction parallel to the upper surface of the substrate 12, each first protrusion 66E and the adjacent second touch electrode strip 24A generate capacitance coupling, thereby increasing the difference between the coupling capacitance between the ridges of the fingerprint and the fingerprint identification electrode structure 14E and the total coupling capacitance between the valleys of the fingerprint and the fingerprint identification electrode structure 14E. In this embodiment, the thickness of the insulating layer 18E is greater than 10 μm, for example. In one embodiment, the upper surface of the second conductive layer 20A and the upper surface of the first protrusions 66E may be located on the same plane.

In this embodiment, for example but not limited to, each of the first touch electrode strips 22E is a sensing electrode strip that senses a capacitance change generated by ridges or valleys of a fingerprint to generate a sensing signal, and each of the second touch control electrode strips 24A is a driving electrode strip that transmits a driving signal. In another embodiment, each of the first touch electrode strips may be a driving electrode strip, and each of the second touch electrode strips may be a sensing electrode strip.

Figure 12:
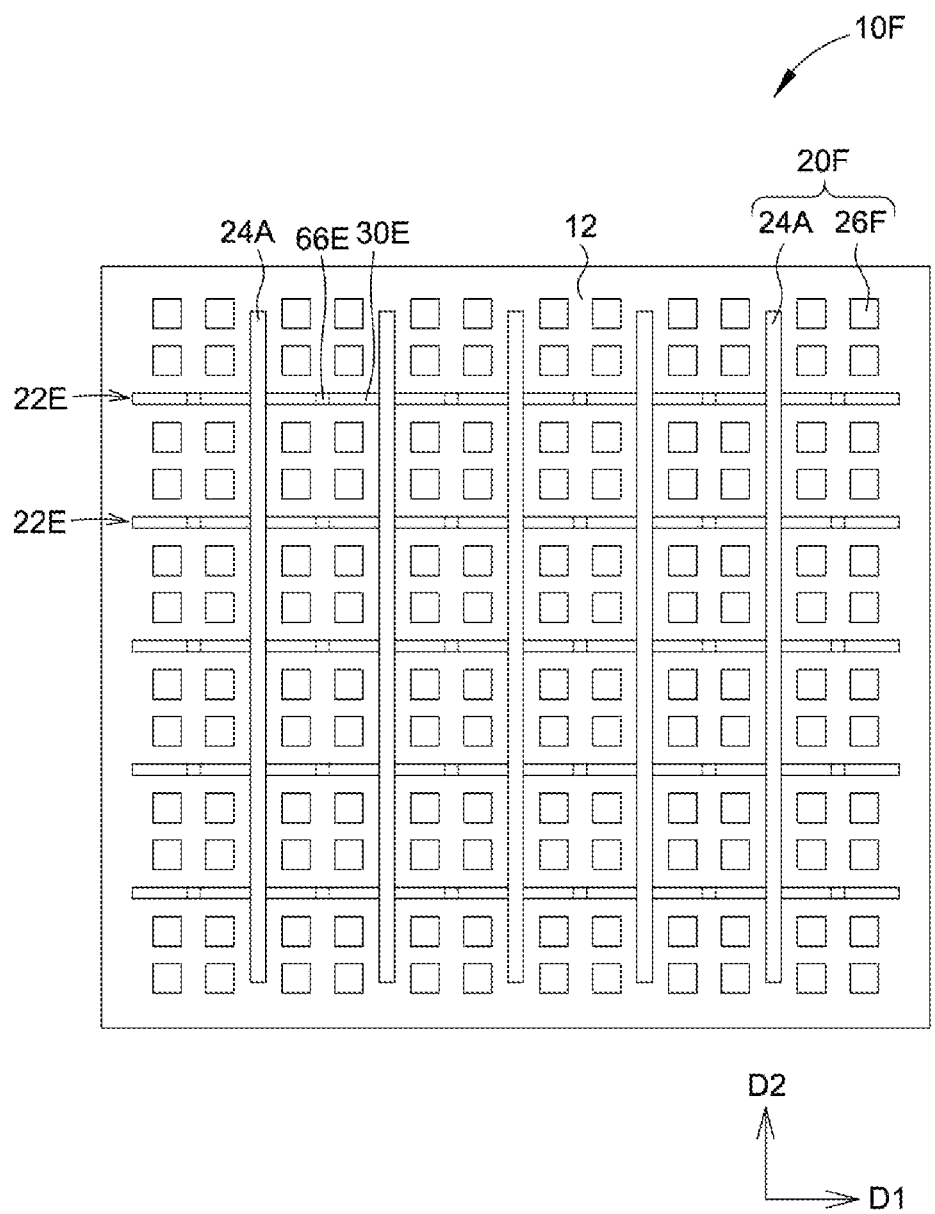
FIG. 12 is a top view of a fingerprint reader according to a sixth embodiment of the present invention.

FIG. 12 shows a top view of a fingerprint reader according to a sixth embodiment of the present invention. As shown in FIG. 12, differences of a fingerprint reader 10F of this embodiment from the fifth embodiment are that, a second conductive layer 20F of this embodiment further includes a plurality of dummy electrodes 26F, which do not overlap the first touch electrode strips 22E and the second touch electrode strips 24A. More specifically, in this embodiment, the dummy electrodes 26F are separated and insulated from the second touch electrode strips 24A and the first protrusions 66E of the first touch electrode strips 22E, such that the dummy electrodes 26F are kept floating. In this embodiment, for example but not limited to, four dummy electrodes 26F are disposed in a matrix arrangement in a region surrounded by two adjacent first touch electrode strips 22E and two adjacent second touch electrode strips 24A. In another embodiment, the number of dummy electrodes disposed in a region surrounded by any two adjacent first touch electrodes and any two adjacent second touch electrode strips may be at least one, and may be adjusted according to the width of the dummy electrodes.

Figure 13:
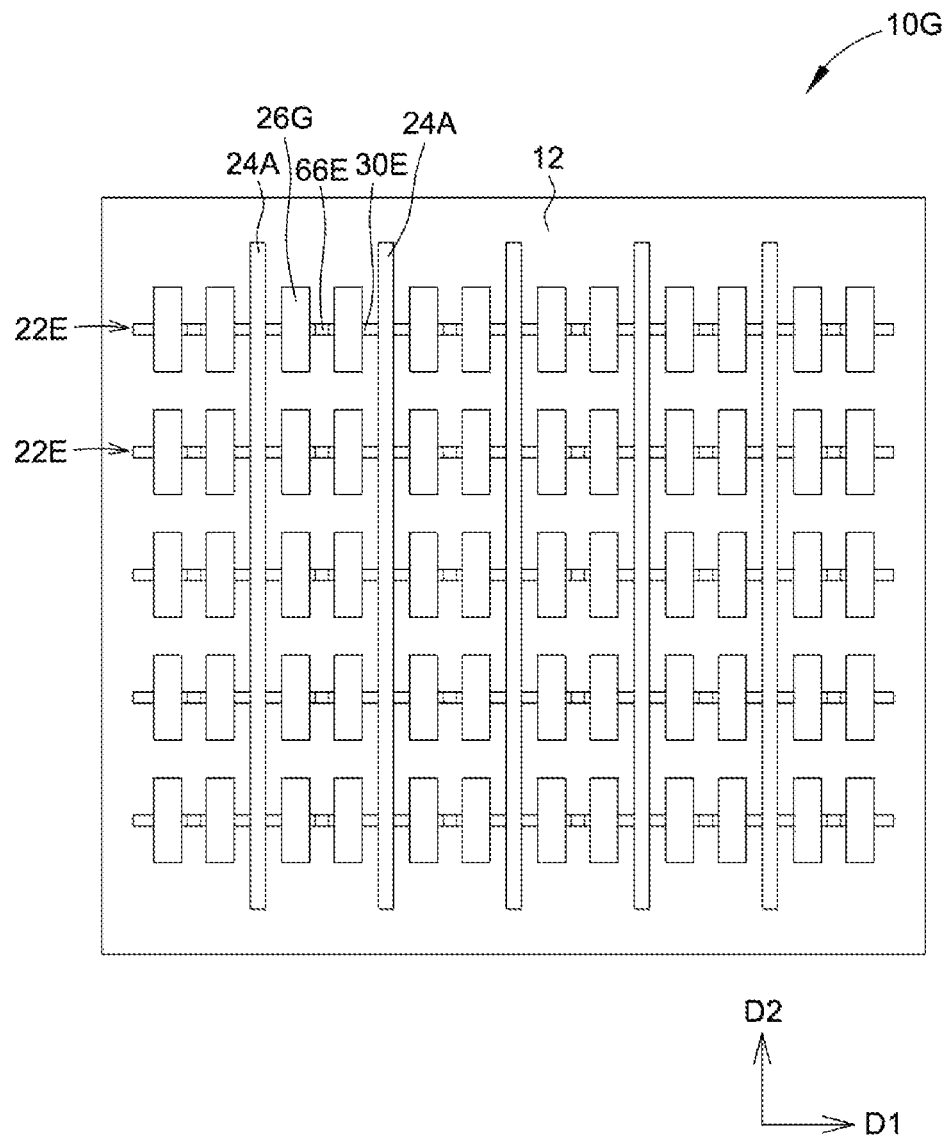
FIG. 13 is a top view of a fingerprint reader according to a seventh embodiment of the present invention.

FIG. 13 shows a top view of a fingerprint reader according to a seventh embodiment of the present invention. As shown in FIG. 13, a difference of a fingerprint reader 10G of this embodiment from the sixth embodiment is that, in a direction perpendicular to the substrate 12, a part of each of the first touch electrode strips 22E that is located between any two adjacent second touch electrodes strips 24A overlaps at least one of dummy electrodes 26G. More specifically, the part of each first touch electrode strip 22E located between any two adjacent second touch electrode strips 24A intersects and overlaps two dummy electrodes 26G, and the dummy electrodes 26G are separated from the second touch electrode strips 24A and the first protrusions 66E of the first touch electrode strips 22E, such that the dummy electrodes 26G are electrically insulated from the first touch electrode strips 22E and the second touch electrode strips 24A. Further, each dummy electrode 26G is disposed between each first protrusion 66E and the adjacent second touch electrode strip 24A. In the present invention, the number and width of the dummy electrodes that partially overlap each first touch electrode strip located between any two adjacent touch electrode strips are not limited to the above exemplary values, and the number of dummy electrodes may be correspondingly adjusted according to the width of the dummy electrodes in the first direction when given a limited gap between any two adjacent second touch electrode strips.

Figure 14:
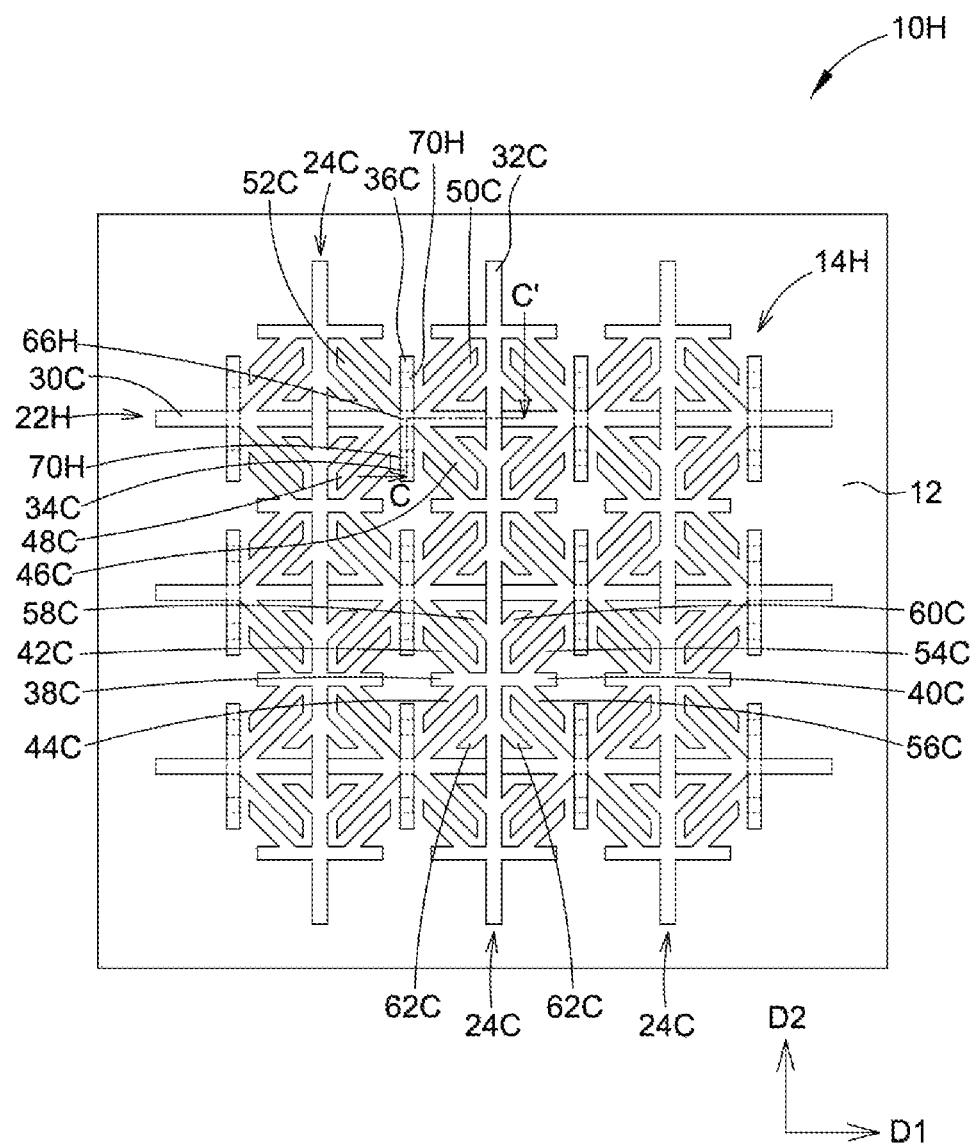
FIG. 14 is a top view of a fingerprint reader according to an eighth embodiment of the present invention.
Figure 15:
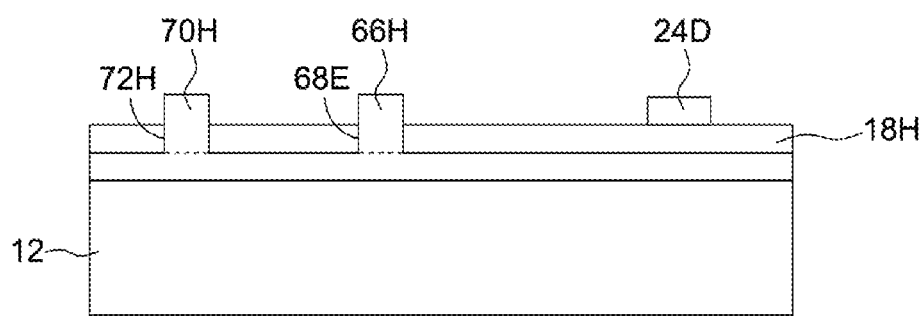
FIG. 15 is a section view along a section line C-C' in FIG. 14.

Referring to FIG. 14 and FIG. 15, FIG. 14 shows a top view of a fingerprint reader according to an eighth embodiment of the present invention; FIG. 15 shows a section view along a section line C-C' in FIG. 14. As shown in FIG. 14 and FIG. 15, differences of a fingerprint reader 10H of this embodiment from the fifth embodiment are that, a top view pattern of first touch electrode strips 22H of this embodiment is identical to that of the first touch electrode strips of the third embodiment, and the structure of the second touch electrode strips 24C is identical to that of the second touch electrode strips of the third embodiment. That is to say, compared to the third embodiment, each of the first touch electrode strips 22H of this embodiment further includes a plurality of first protrusions 66H and a plurality of second protrusions 70H, with the first protrusions 66H protruding from the upper surface of the first strip portion 30C. For brevity, identical details of the first touch electrode strips 22H and the second touch electrode strips 24C of this embodiment as those of the third embodiment and the fifth embodiment are omitted herein.

In this embodiment, in addition to the first openings 68E, an insulating layer 18H may further include a plurality of second openings 72H disposed correspondingly to the branches. The second protrusions 70H protrude from an upper surface of any of the branches and penetrate second openings 72H, respectively. More specifically, the second protrusions 70H may be disposed on the first branches 34C and the second branches 36C, and respectively protrude from upper surfaces of the first branches 34C and the second branches 36C. In one embodiment, the upper surface of the second conductive layer 20C and upper surfaces of the second protrusions 70H may be located on the same plane. For example but not limited to, the first protrusions 66H and the second protrusions 70H are rectangles. In another embodiment, a part of the second protrusions may be disposed on the third, fourth, fifth and sixth branches of the first touch electrode strips. Alternatively, one of the second protrusions covers the first trident-shaped structures formed by the first branches, the third branches and the fourth branches, or the second trident-shaped structures formed by the second branches, the fifth branches and the sixth branches, such that the second protrusions also have a trident-shaped structure.

In another embodiment, the second conductive layer may further include dummy electrodes, which, in a direction perpendicular to the substrate, overlap the first touch electrode strips. For example, the dummy electrodes may overlap at least one of the first, second, third, fourth, fifth and sixth branches and the first strip portions. Alternatively, in the direction perpendicular to the substrate, the dummy electrodes do not overlap the first touch electrode strips or the second touch electrode strips.

Figure 16:
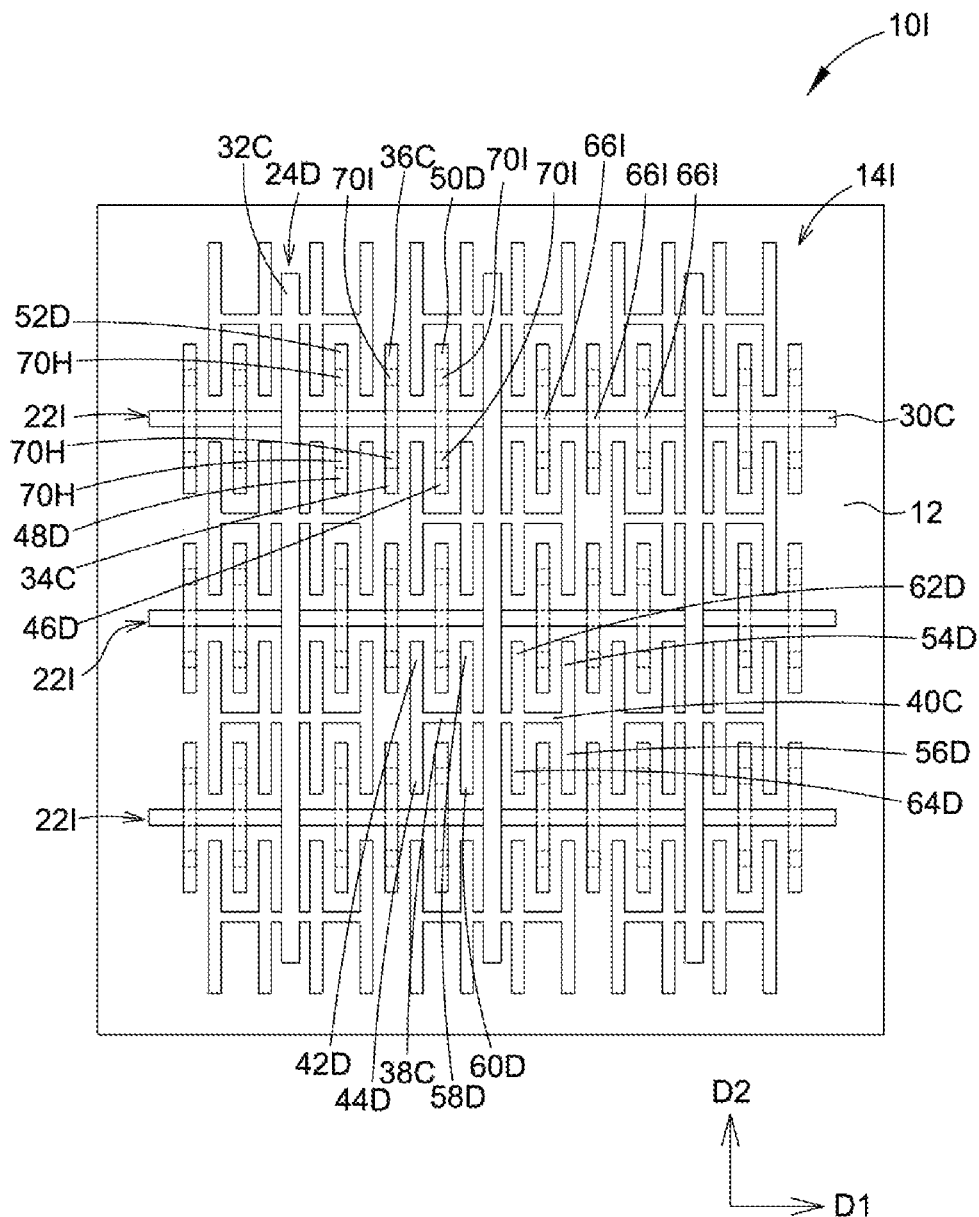
FIG. 16 is a top view of a fingerprint reader according to a ninth embodiment of the present invention.

FIG. 16 shows a top view of a fingerprint reader according to a ninth embodiment of the present invention. As shown in FIG. 16, differences of a fingerprint reader 10I from the eighth embodiment are that, a top view pattern of first touch electrode strips 22I of this embodiment is identical to that of the first touch electrode strips of the fourth embodiment, and a structure of the second touch electrode strips 24D is identical to that of the second touch electrode strips of the fourth embodiment. That is to say, compared to the fourth embodiment, each of the first touch electrode strips 22I of this embodiment further includes a plurality of first protrusions 66I and a plurality of second protrusions 70I. Thus, identical details of the first touch electrode strips 22I and the second touch electrode strips 24D of this embodiment as those of the fourth embodiment and the eighth embodiment are omitted herein.

In this embodiment, each first strip portion 30C located between each first branch 34C and each second branch 36C, between each third branch 46D and each fifth branch 50D, and between each fourth branch 48D and each sixth branch 52D is provided with the first protrusions 66I. The second protrusions 70I are respectively disposed on the first branches 34C, the second branches 36C, the third branches 46D, the fourth branches 48D, the fifth branches 50D and the sixth branches 52D, and respectively extend from upper surfaces of the first branches 34C, the second branches 36C, the third branches 46D, the fourth branches 48D, the fifth branches 50D and the sixth branches 52D.

In another embodiment, one of the second protrusions may cover the first branches 34C, the second branches 36C, the third branches 46D, the fourth branches 48D, the fifth branches 50D and the sixth branches 52D. Alternatively, the first protrusions and the second protrusions may form a trellis structure.

Figure 17:
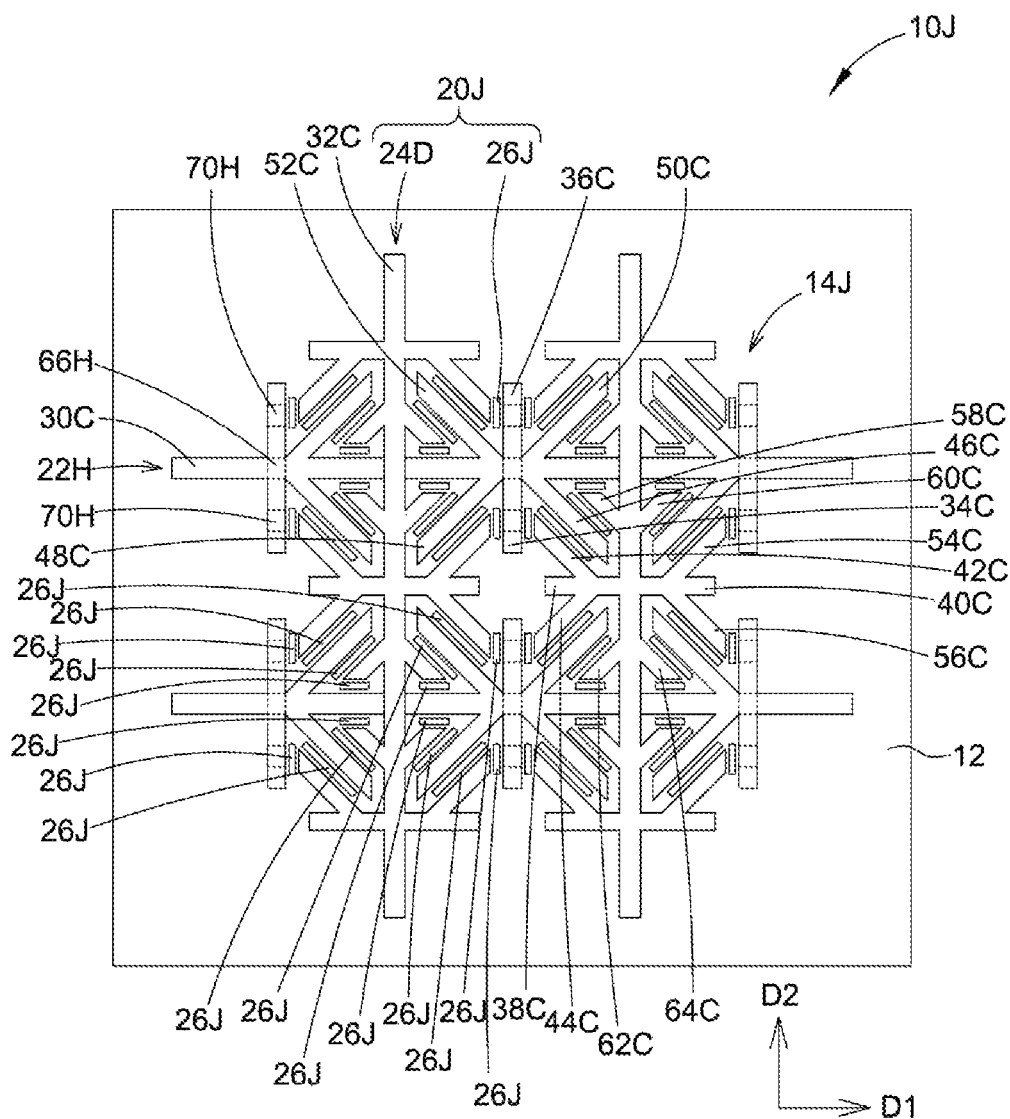
FIG. 17 is a top view of a fingerprint reader according to a tenth embodiment of the present invention.

FIG. 17 shows a top view of a fingerprint reader according to a tenth embodiment of the present invention. As shown in FIG. 17, differences of a fingerprint reader 10J of this embodiment from the eighth embodiment are that, a second conductive layer 20J of this embodiment may further include a plurality of dummy electrodes 26J, which are disposed between the first touch electrode strips 22H and the second touch electrode strips 24D. More specifically, one of the dummy electrodes 26J may be disposed between the first branch 34C and the first secondary branch 42C, between the first branch 34C and the third secondary branch 54C, between the third branch 46C and the first secondary branch 42C, between the third branch 46C and the fifth secondary branch 58C, between the fourth branch 48C and the third secondary branch 54C, between the fourth branch 48C and the sixth secondary branch 60C, between the first strip portion 30C and the fifth secondary branch 58C, between the first strip portion 30C and the sixth secondary branch 60C, between the first strip portion 30C and the seventh secondary branch 62C, between the first strip portion 30C and the eighth secondary branch 64C, between the second branch 36C and the second secondary branch 44C, between the second branch 36C and the fourth secondary branch 56C, between the fifth branch 50C and the second secondary branch 44C, between the fifth branch 50C and the seventh secondary branch 62C, between the sixth branch 52C and the fourth secondary branch 56C, or between the sixth branch 52C and the eighth secondary branch 64C. In this embodiment, the dummy electrodes 26J are disposed between the branches of the first touch electrode strips 22H and the first strip portions 30C, and between the secondary branches of the second touch electrode strips 24C.

In conclusion, with the dummy electrodes overlapping the first touch electrode strips, as well as the additionally disposed branches, main branches and secondary branches or the protrusions penetrating the openings of the insulating layer, the fingerprint identification electrode structure of the present invention is capable of increasing the coupling capacitance between the first touch electrode strips and the second touch electrode strips to increase the difference between the total coupling capacitance value between the ridges of a fingerprint and the fingerprint identification electrode structure and the total coupling capacitance value between the valleys of the fingerprint and the fingerprint identification electrode structure, thereby enhancing the identification rate.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A fingerprint identification electrode structure, disposed on a substrate, for detecting a fingerprint of a finger, comprising:
a first conductive layer, comprising a plurality of first touch electrode strips separated from one another and extending along a first direction;
a second conductive layer, comprising a plurality of second touch electrode strips and a plurality of dummy electrodes, the second touch electrode strips separated from one another and extending along a second direction different from the first direction; wherein, the first touch electrodes strips and the second touch electrode strips intersect, the second touch electrode strips and the dummy electrodes are separated from one another, the dummy electrodes are kept floating, a gap between the second conductive layer and a finger is smaller than a gap between the first conductive layer and the finger, and a part of each of the first touch electrode strips that is located between any two adjacent second touch electrode strips overlaps at least one of the dummy electrodes; and
an insulating layer, disposed between the first conductive layer and the second conductive layer,
wherein the second touch electrode strips and the dummy electrodes are located on a same horizontal plane,
wherein a gap between centers of every two adjacent first touch electrode strips and a gap between centers of every two adjacent second touch electrode strips are smaller than or equal to 50 μm.

2. The fingerprint identification electrode structure according to claim 1, wherein the part of each of the first touch electrode strips that is located between any two adjacent second touch electrode strips overlaps a plurality of the dummy electrodes.

3. The fingerprint identification electrode structure according to claim 1, wherein each of the first touch electrodes is a driving electrode strip that transmits a driving signal, and each of the second touch electrode strips is a sensing electrode strip that generates a sensing signal.

4. The fingerprint identification electrode structure according to claim 1, wherein each of the first touch electrode strips is a sensing electrode strip that generates a sensing signal, and each of the second touch electrode strips is a driving electrode that transmits a driving signal.

5. The fingerprint identification electrode structure according to claim 1, wherein a thickness of the insulating layer is between 2000 Å and 3000 Å.

6. The fingerprint identification electrode structure according to claim 1, wherein a thickness of the insulating layer is greater than 10 μm.

7. A fingerprint identification electrode structure, disposed on a substrate, for detecting a fingerprint of a finger, comprising:
a first conductive layer, comprising a plurality of first touch electrode strips separated from one another and extending along a first direction, each of the first touch electrode strips comprising a first strip portion, a plurality of first branches and a plurality of second branches, the first branches and the second branches extending along a second direction different from the first direction and a direction opposite the second direction from two sides of the first strip portion, respectively;
a second conductive layer, comprising a plurality of second touch electrode strips separated from one another and extending along the second direction, the first touch electrode strips and the second touch electrode strips intersecting and insulated from one another, a gap between the second conductive layer and the finger being smaller than a gap between the first conductive layer and the finger, each of the second touch electrode strips comprising a second strip portion, a plurality of first main branches and a plurality of second main branches, the first main branches and the second main branches extending along the first direction and a direction opposite the first direction from two sides of the second strip portion, respectively; and
an insulating layer, disposed between the first conductive layer and the second conductive layer,
wherein the first direction is perpendicular to the second direction,
wherein a gap between centers of every two adjacent first touch electrode strips and a gap between centers of every two adjacent second touch electrode strips are smaller than or equal to 50 μm.

8. The fingerprint identification electrode structure according to claim 7, wherein each of the second touch electrode strips further comprises a plurality of first secondary branches and a plurality of second secondary branches, the first secondary branches and the second secondary branches extend from two sides of each of the first main branches, respectively, each of the first secondary branches extends to between each first branch adjacent to each first main branch and the second strip portion, each of the second secondary branches extends to between each second branch adjacent to each first main branch and the second strip portion, and the first main branches, the second main branches, the first secondary branches and the second secondary branches do not overlap the first branches and the second branches.

9. The fingerprint identification electrode structure according to claim 8, wherein each of the first touch electrode strips further comprises a plurality of third branches, a plurality of fourth branches, a plurality of fifth branches and a plurality of sixth branches, the third branches and the fourth branches of each of the first touch electrodes strips extend from the first strip portion at two sides of each of the first branches, respectively, and are in contact with each of the first branches, each first branch, each third branch and each fourth branch of each first touch electrode strip form a trident-shaped structure, the fifth branches and the sixth branches of each of the first touch electrode strips extend from the first strip portion at two sides of each of the second branches, respectively, and are in contact with the second branches, and each second branch, each fifth branch and each sixth branch of each first touch electrode strip form another trident-shaped structure.

10. The fingerprint identification electrode structure according to claim 9, wherein each of the first secondary branches extends to between each of the first branches and each of the third branches, each of the second secondary branches extends to each of the second branches and each of the fifth branches, and each first main branch, each first secondary branch and each second secondary branch form another trident-shaped structure.

11. The fingerprint identification electrode structure according to claim 9, wherein each of the second touch electrode strips further comprises a plurality of third secondary branches and a plurality of fourth secondary branches, the third secondary branches and the fourth secondary branches extend from two sides of each of the second main branches, respectively, each of the third secondary branches extends to between each of the first branches and each of the fourth branches, each of the fourth secondary branches extends to between each of the second branches and each of the sixth branches, and each second main branch, each third secondary branch and each fourth secondary branch form another trident-shaped structure.

12. The fingerprint identification electrode structure according to claim 8, wherein each of the first touch electrode strips further comprises a plurality of third branches, a plurality of fourth branches, a plurality of fifth branches and a plurality of sixth branches, the third branches and the fourth branches of each of the first touch electrode strips extend along a direction opposite the second direction from one side of the first strip portion connected to the first branches, and the fifth branches and the sixth branches of each of the first touch electrode strips extend along the second direction from one side of the first strip portion connected to the second branches.

13. The fingerprint identification electrode structure according to claim 12, wherein each of the first secondary branches extends along the second direction to between each of the first branches and each of the third branches, and each of the second secondary branches extends along the direction opposite the second direction to between each of the second branches and each of the fifth branches.

14. The fingerprint identification electrode structure according to claim 12, wherein each of the second touch electrode strips further comprises a plurality of third secondary branches and a plurality of fourth secondary branches, the third secondary branches and the fourth secondary branches extend from two sides of each of the second main branches, respectively, each of the third secondary branches extends along the second direction to between each of the first branches and each of the fourth branches, and each of the fourth secondary branches extends along the direction opposite the second direction to between each of the second branches and each of the sixth branches.

15. A fingerprint identification electrode structure, disposed on a substrate, for detecting a fingerprint of a finger, comprising:
a first conductive layer, comprising a plurality of first touch electrode strips separated from one another and extending along a first direction, each of the first touch electrode strips comprising a strip portion and a plurality of first protrusions, the first protrusions protruding from an upper surface of the first strip portion;
an insulating layer, disposed on the first strip portion, comprising a plurality of openings; wherein, the first protrusions respectively penetrating the openings, and a thickness of the first protrusions is greater than a thickness of the insulating layer; and
a second conductive layer, disposed on the insulating layer, comprising a plurality of second touch electrode strips separated from one another and extending along a second direction different from the first direction;
wherein, the first touch electrode strips and the second touch electrode strips intersect and are insulated from one another, and a gap between the second conductive layer is smaller than a gap between the first conductive layer and the finger,
wherein the first protrusions and the first touch electrode strips are a same conductive material,
wherein a gap between centers of every two adjacent first touch electrode strips and a gap between centers of every two adjacent second touch electrode strips are smaller than or equal to 50 μm, and a thickness of the insulating layer is greater than 10 μm.

16. The fingerprint identification electrode structure according to claim 15, wherein an upper surface of the first conductive layer and upper surfaces of the first protrusions are located on a same plane.

17. The fingerprint identification electrode structure according to claim 15, wherein each of the first touch electrode strips is a sensing electrode strip that generates a sensing signal, and each of the second touch electrode strips is a driving electrode that transmits a driving signal.

18. The fingerprint identification electrode structure according to claim 15, wherein the second conductive layer further comprises a plurality of dummy electrodes, which are separated and insulated from the second touch electrode strips and the first protrusions, wherein the dummy electrodes are kept floating.

19. The fingerprint identification electrode structure according to claim 18, wherein at least one of the dummy electrodes is disposed in a region surrounded by any two adjacent first touch electrode strips and any two adjacent second touch electrode strips.

20. The fingerprint identification electrode structure according to claim 18, wherein a part of each of the first touch electrode strips that is located between any two adjacent second touch electrode strips overlaps at least one of the dummy electrodes.

21. The fingerprint identification electrode structure according to claim 15, wherein each of the first touch electrode strips further comprises a plurality of first branches and a plurality of second branches, the first branches and the second branches extend along the second direction and a direction opposite the second direction from two sides of the first strip portion, respectively, each of the second touch electrode strips comprises a second strip portion, a plurality of first main branches, a plurality of second main branches, a plurality of first secondary branches and a plurality of second secondary branches, the first main branches and the second main branches extend along the first direction and a direction opposite the first direction from two sides of the second strip portion, respectively, the first secondary branches and the second secondary branches extend from two sides of each of the main branches, respectively, each of the first secondary branches extends to between each of the first branches adjacent to each of the first main branches and the second strip portion, each of the second secondary branches extends to between each of the second branches adjacent to each of the first main branches and the second strip portion, and the first main branches, the second main branches, the first secondary branches and the second secondary branches do not overlap the first branches and the second branches.

22. The fingerprint identification electrode structure according to claim 21, wherein each of the first touch electrode strips further comprises a plurality of third branches, a plurality of fourth branches, a plurality of fifth branches a plurality of sixth branches, the third branches and the fourth branches of each of the first touch electrode strips extend from two sides of the first strip portion at two sides of each of the first branches and are in contact with the first branches, each first branch, each third branch and each fourth branch of each first touch electrode strip form a trident-shaped structure, the fifth branches and the sixth branches of each of the first touch electrode strips extend from the first strip portion at two sides of each of the second branches, respectively, and come into contact with the second branches, and each second branch, each fifth branch and each sixth branch of each first touch electrode strip form another trident-shaped structure.

23. The fingerprint identification electrode structure according to claim 22, wherein each of the first secondary branches extends to between each of the first branches and each of the third branches, each of the second secondary branches extends to between each of the second branches and each of the fifth branches, and each first main branch, each first secondary branch and each second secondary branch form another trident-shaped structure.

24. The fingerprint identification electrode structure according to claim 22, wherein each of the second touch electrode strips further comprises a plurality of third secondary branches and a plurality of fourth secondary branches, the third secondary branches and the fourth secondary branches extend from two sides of each of the second main branches, respectively, each of the third secondary branches extends to between each of the first branches and each of the fourth branches, each of the fourth secondary branches extends to between each of the second branches and each of the sixth branches, and each second main branch, each third secondary branch and each fourth secondary branch form another trident-shaped structure.

25. The fingerprint identification electrode structure according to claim 21, wherein each of the first touch electrode strips further comprises a plurality of third branches, a plurality of fourth branches, a plurality of fifth branches and a plurality of sixth branches, the third branches and the fourth branches of each of the first touch electrode strips extend along the direction opposite the second direction from one side of the first strip portion connected to the first branches, and the fifth branches and the sixth branches of each of the first touch electrode strips extend along the second direction from one side of the first strip portion connected to the second branches.

26. The fingerprint identification electrode structure according to claim 25, wherein each of the first secondary branches extends along the second direction to between each of the first branches and each of the third branches, and each of the second secondary branches extends along the direction opposite the second direction to between each of the second branches and each of the fifth branches.

27. The fingerprint identification electrode structure according to claim 25, wherein each of the second touch electrode strips further comprises a plurality of third secondary branches and a plurality of fourth secondary branches, the third secondary branches and the fourth secondary branches extend from two sides of each of the second main branches, each of the third secondary branches extends along the second direction to between each of the first branches and each of the fourth branches, and each of the fourth secondary branches extends along the direction opposite the second direction to between each of the second branches and each of the sixth branches.

28. The fingerprint identification electrode structure according to claim 21, wherein each of the first touch electrode strips further comprises a plurality of second protrusions protruding from upper surfaces of the first branches and the second branches.

* * * * *